United States Patent
Kinoshita et al.

[11] Patent Number: 5,392,173
[45] Date of Patent: Feb. 21, 1995

[54] METHOD AND APPARATUS FOR CONTROLLING A SMALL SPACING BETWEEN A MAGNETIC HEAD AND A MAGNETIC RECORDING MEDIUM

[75] Inventors: Kazuto Kinoshita, Tsukuba; Toshio Akatsu, Ushiku; Jun Naruse, Odawara, all of Japan

[73] Assignee: Hitachi, Ltd., Tokyo, Japan

[21] Appl. No.: 87,355

[22] Filed: Jul. 8, 1993

Related U.S. Application Data

[63] Continuation of Ser. No. 639,201, Jan. 9, 1991, abandoned.

[30] Foreign Application Priority Data

Jan. 17, 1990 [JP]   Japan .................. 2-006101

[51] Int. Cl.$^6$ .................. G11B 21/02; G11B 5/596; G11B 5/56; G11B 5/127
[52] U.S. Cl. .................. 360/75; 360/77.03; 360/109; 360/110
[58] Field of Search .................. 360/75, 77.03, 109, 360/110

[56] References Cited

U.S. PATENT DOCUMENTS

| | | | |
|---|---|---|---|
| 4,146,911 | 3/1979 | Gyi et al. | 360/75 |
| 4,570,191 | 2/1986 | DiStefano et al. | 360/77 |
| 4,593,368 | 6/1986 | Fridge et al. | 360/75 |
| 4,931,887 | 6/1990 | Hedge et al. | 360/75 |

FOREIGN PATENT DOCUMENTS

| | | | |
|---|---|---|---|
| 0160793 | 11/1985 | European Pat. Off. | |
| 0227845 | 7/1987 | European Pat. Off. | |
| 0182568 | 9/1985 | Japan | 360/75 |
| 62-125521 | 6/1987 | Japan | |

*Primary Examiner*—Timothy P. Callahan
*Assistant Examiner*—Trong Phan

[57] ABSTRACT

The spacing between a magnetic disk surface and a magnetic head tends to greatly decrease with an increasing request for higher density records. Measuring and controlling the small spacing is important for stabilized recording or reading. A substrate is attached to a side of a support which supports the magnetic head. Light is irradiated onto a surface of the substrate and totally reflected thereby. The small spacing is measured by measuring the quantity of the totally reflected light. An actuator is controlled such that the measured small spacing is maintained at a target value to thereby realize constant small-spacing control.

18 Claims, 9 Drawing Sheets

METHOD AND APPARATUS FOR CONTROLLING A SMALL SPACING BETWEEN A MAGNETIC HEAD AND A MAGNETIC RECORDING MEDIUM

This is a continuation of application Ser. No. 07/639,201, filed Jan. 9, 1991, now abandoned.

BACKGROUND OF THE INVENTION

The present invention relates to a method and device for controlling a small spacing between a magnetic head and a magnetic recording medium in a magnetic recording apparatus.

A conventional small spacing control device, as disclosed in JP-A-62-125521, includes a magnetic recording medium having an electrically conductive surface and connected to a power source, a unit for controlling a small spacing between the surface of the magnetic recording medium and a magnetic head, a tunnel electrode attached to the magnetic head for measuring the small spacing and connected to the power source. The small spacing control device measures the small spacing between the magnetic head and the magnetic recording medium on the basis of the magnitude of a tunnel current flowing across the tunnel electrode and magnetic recording medium surface, and feeds the measured value back to the control device so that the small spacing is constant.

Since the tunnel effect is used for measuring the small spacing using the control device, the surface of the magnetic recording medium to be measured is required to have an electrically conductive surface. Furthermore, means for applying a voltage across the conductive surface of the magnetic recording medium and the tunnel electrode provided on the magnetic head is required. Usually, such voltage applying means generates noise when the magnetic recording medium moves, so that the control device is not suitable for measuring such small current. Means for applying such voltage to the moving magnetic recording medium is not disclosed in JP-A 62-125521.

SUMMARY OF THE INVENTION

It is an object of the present invention to provide a small spacing control method and apparatus for measuring a small spacing between the head and a magnetic recording medium with high accuracy without being influenced by the kind of the magnetic recording medium.

It is another object of the present invention to provide a small spacing control method and apparatus for controlling a small spacing between the head and a magnetic recording medium using a simple structure.

In one aspect of the present invention, there is provided a method of controlling a small spacing between a magnetic recording medium and a magnetic head by moving the magnetic recording medium and magnetic head relative to each other in a magnetic recording apparatus, comprising the steps of:

irradiating light along a plane of a substrate provided in the vicinity of the magnetic head on a side of a support which supports the magnetic head such that the light is totally reflected by an end face of the substrate opposing the magnetic recording medium;

receiving light reflected by the end face due to such irradiation using a photodetection element to provide a photodetection intensity signal;

calculating a measured small-spacing signal corresponding to the small spacing on the basis of the photodetection intensity signal;

computing a control signal to eliminate the difference between the measured small-spacing signal and a target small-spacing signal in accordance with the difference; and outputting the control signal to means for adjusting the small spacing between the magnetic head and the magnetic recording medium.

In another aspect of the present invention, there is provided a device for controlling a small spacing between a magnetic recording medium and a magnetic head supported by a support in a magnetic recording apparatus such that a track on the magnetic recording medium is randomly accessed by the magnetic head, comprising:

a substrate fixed to the support in the vicinity of the magnetic head such that the substrate has a plane perpendicular to a surface of the magnetic recording medium;

a light emitting element provided on the substrate;

an incident side light guide for guiding the light from the light emitting element such that the light is totally reflected by an end face of the substrate opposing the magnetic recording medium;

a reflected side light guide formed on the substrate for guiding the light reflected by the end face;

a photodetection element for detecting the reflected light guided by the reflected side light guide and outputting a photodetection intensity signal in accordance with the intensity of the detected light;

a small-spacing computing unit for outputting a measured small spacing signal corresponding to the photodetection intensity signal;

a control computing unit for computing and outputting a control signal to eliminate the difference between the measured small-spacing signal and a target small-spacing signal in accordance with that difference; and a magnetic head height position adjusting actuator for adjusting the small spacing between the magnetic head and the magnetic recording medium in accordance with the control signal.

Other features and objects of the present invention will be apparent from the following detailed description with reference to the drawings.

DESCRIPTION OF THE PREFERRED EMBODIMENTS

The basic concept of the present invention will be described before an embodiment of the present invention is described.

Assume that light is irradiated onto an optical transparent material and totally reflected by an end face of the material. When the incident light arrives at the end face, a small amount of light oozes out of the transparent material and again enters same to become reflective light. The oozing-out light is called an evanescent wave and such effect is called an evanescent effect. When another medium is placed close to a small region where light oozes out, a quantity of light reflected by an end face of the optically transparent material differs from that occurring when there is no such medium in that region. If another medium is moved in the small region to thereby change the gap between the end face of the material and the medium surface, the quantity of reflected light changes continuously. Therefore, there is a one-to-one correspondence relationship between such small spacing and the quantity of reflected light, so that the small spacing is measured by detecting the quantity of reflected light. In the embodiment of the present invention to be described hereinafter, the small spacing between the magnetic head and magnetic recording medium is measured using such relationship.

While the present invention is also applicable to magnetic tape recording devices, and magnetic recording devices such as VTRs using a magnetic recording medium, the present embodiment which uses a rotating disk-like magnetic recording medium will be described.

Figure 1:
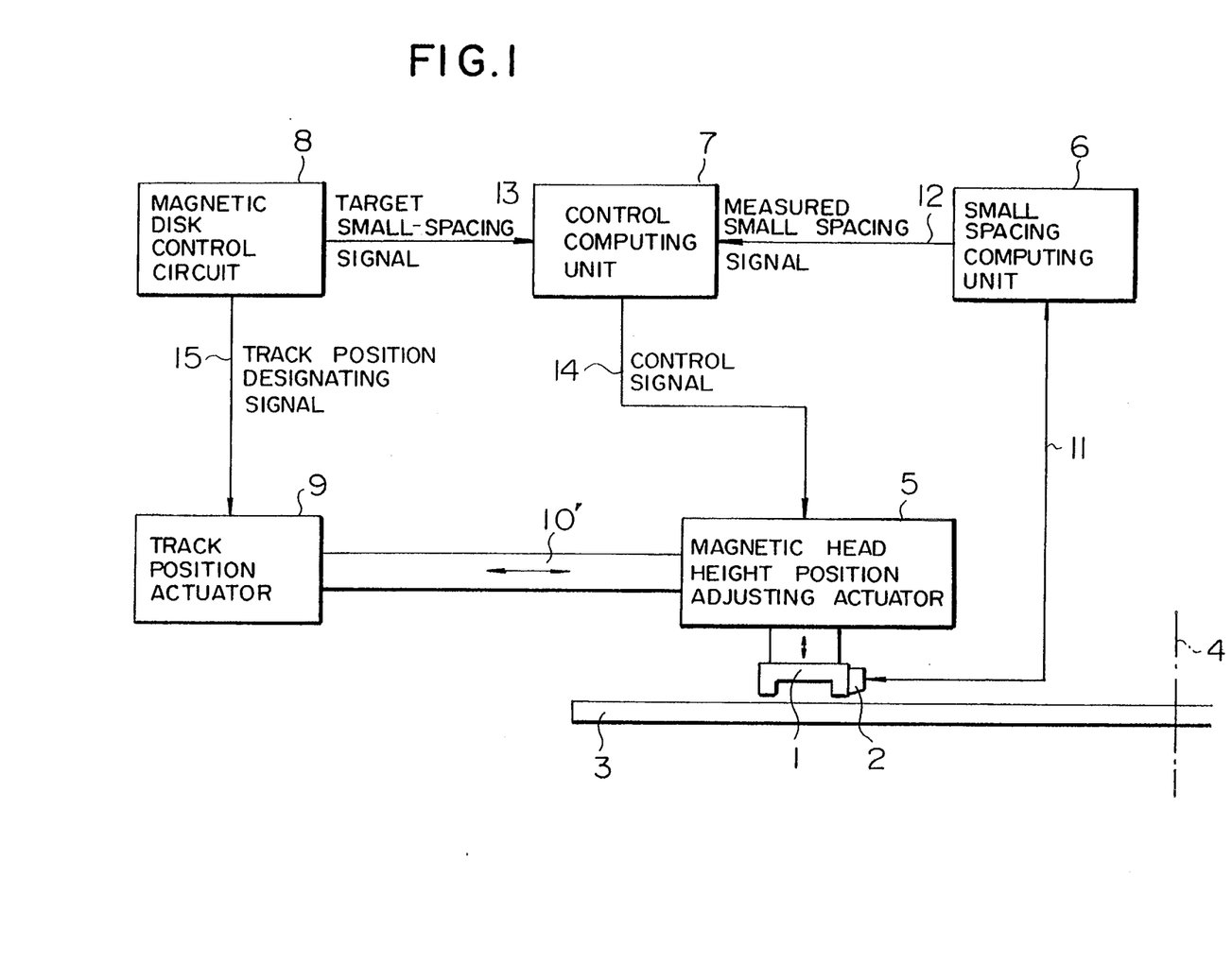
FIGS. 1 and 2 show the structure of an illustrative embodiment of the present invention.
Figure 2:
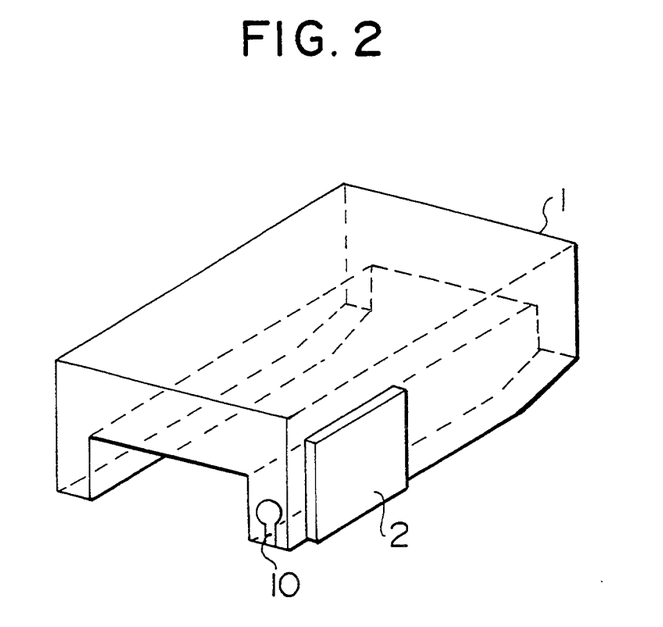

FIG. 1 shows one embodiment of the present invention in which a support 1 is attached so as to oppose a magnetic disk which is a kind of a magnetic recording medium rotating around a rotational shaft 4 and controlled by a magnetic head height position adjusting actuator 5 such that the small spacing is a desired value. In the embodiment, a usual slider may be used as the support 1. Actuator 5 is connected through arm 10' to track position actuator 9 and is moved radially of magnetic disk 3 in accordance with a track position designating signal 15 from magnetic disk controller 8. Optical converter 2 is attached to a side of support 1 and connected through a line 11 to a small spacing computing unit 6, which measures the small spacing and delivers a measured small spacing signal to control computing unit 7. Computing unit 7 compares a target small-spacing signal 13 from magnetic disk controller 8 and the measured small-spacing signal 12 to control such that the error becomes zero. FIG. 2 shows support 1 and optical converter 2 on enlarged scale.

Figure 3:
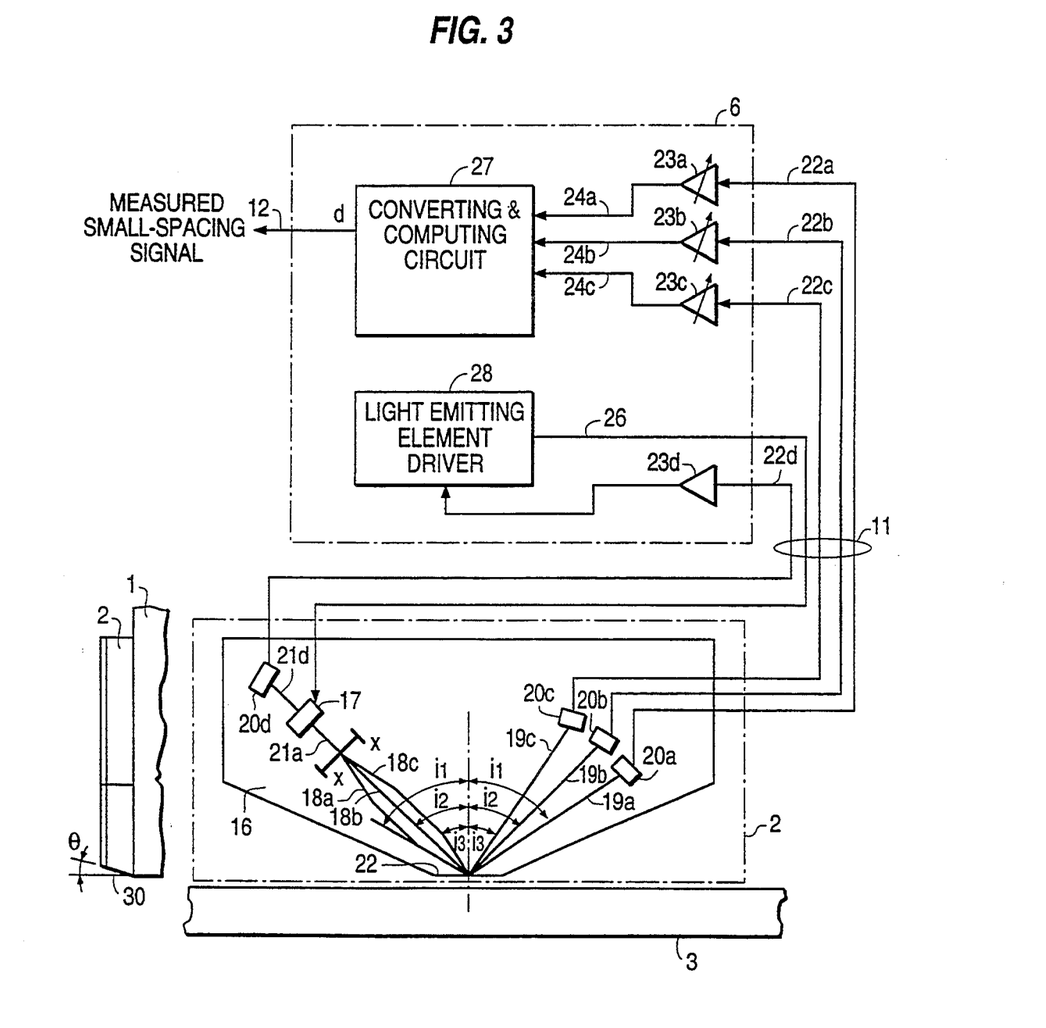
FIG. 3 illustrates a structure for measuring a small spacing.

Optical converter 2 and small-spacing computing unit 6 will be described in more detail hereinafter. FIG. 3 shows optical converter 2 and small-spacing computing unit 6. A process for manufacturing the respective optical elements of optical converter 2 is well known and further description thereof will be omitted. Optical converter 2 includes, on substrate 16, light emitting element 17, optical waveguides 21a, 21b which guide light from light emitting element 17 to photodetection element 20d and incident light waveguides 18a–18c; three incident light waveguides 18a–18c which guide light from optical waveguide 21a to a lower surface of substrate 16 (hereinafter referred to as a total reflection surface 22), reflected optical waveguides 19a–19c which guide light reflected by total reflection surface 22 to photodetection elements 20a–20c, photodetection elements 20a–20c which detect the respective intensities of the light, and photodetection element 20d which detects the intensity of the light in optical waveguide 21b. A portion of light emitted by light emitting element 17 and appearing on an upper surface of light emitting element 17 is guided through optical waveguide 21b to photodetection element 20d to be used as a signal for controlling the intensity of light emitted by light emitting element 17. The light appearing on a lower surface of the light emitting element is divided through light waveguide 21a to three light portions which are then guided through incident light waveguides 18a–18c to total reflection surface 22. At this time, the light portions incident on total reflection surface 22 differ in incident angle ($i_1$, $i_2$ and $i_3$). Reflected light waveguides 19a–19c are provided so as to coincide with angles at which those light portions are reflected and the reflected light portions are guided to photodetection elements 20a–20c to detect the respective intensities of the light. The length of total reflection surface 22 of substrate 16 is a minimum required and the remaining lower surface is cut at a constant angle so as to reduce an error in which optical converter 2 is attached. As shown left in FIG. 3, total reflection surface 22 is cut at a predetermined angle 8 to thereby prevent total reflection surface 22 from becoming dirty with a lubricant or the like on the surface of the magnetic disk 3.

Small spacing computing unit 6 includes amplifiers 23a–23d, conversion matrix circuit 27 and a light emitting element driver 28 which applies a light emitting element drive signal 26 to light emitting element 17 for light emitting purposes. A light intensity signal 22e detected by photodetection element 20d is amplified by amplifier 23e, the resulting signal is fed as a light emitting output signal back so as to maintain the light emission output constant. Photodetection intensity signals 22a–22c detected by photodetection elements 20a–20c are amplified by amplifiers 23a–23c, the amplified signals are delivered as reflectivity signals 24a–24c to conversion matrix circuit 27 to calculate a measured small spacing signal 12.

If magnetic disk 3 is sufficiently spaced from total reflection surface 22, total reflection occurs on the total reflection surface, so that the outputs of photodetection elements 20a–20c obtained at that time can be assumed to have a reflectivity of 1. This causes the reflectivity to be specified by adjusting and standardizing the amplification degree of amplifiers 23a–23c under the above conditions.

When magnetic disk 3 approaches total reflection surface 22 of substrate 16, reflectivity R is given by $$R = \frac{N_3^2(N_1 - N_2)^2 + (N_3^2 - N_1^2)(N_3^2 - N_2^2)\sin^2\frac{\delta}{2}}{N_3^2(N_1 - N_2)^2 - (N_3^2 - N_1^2)(N_3^2 - N_2^2)\sin^2\frac{\delta}{2}} \quad (1)$$

where $$\delta = \frac{4\pi}{\lambda} n_3 d \sqrt{1 - \frac{n_1^2}{n_3^2}\sin^2 i} \quad (2)$$

and $n_2$ is the refractive index of substrate total reflection surface 22; $n_1$ is the refractive index of the surface of magnetic disk 3; $n_3$ is the refractive index of the spacing;

d is the small spacing; i is the angle of incident light; and λ is the wavelength of the incident light.

Figure 12:
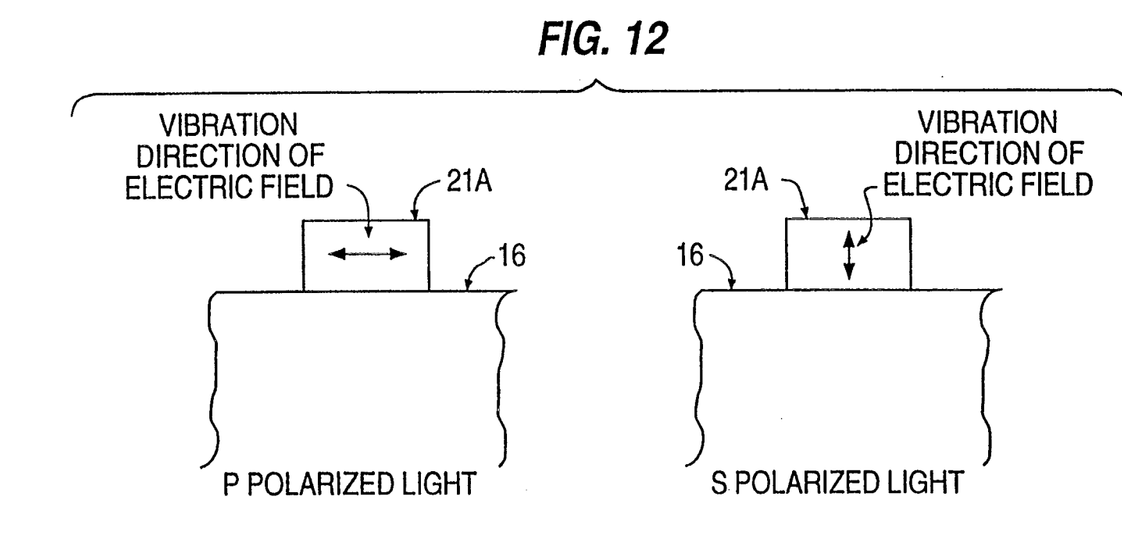
FIG. 12 illustrates a cross-sectional view of the substrate of FIG. 3 along the line X—X, showing directions of an electric field for P polarized light and S polarized light, where the light propagates perpendicular to the sheet of the drawing.

$N_1$, $N_2$ and $N_3$ differ depending on the direction of polarization of the incident light. FIG. 12 shows the direction of an electric field for P polarized light and S polarized light. Reference numeral 16 refers to the substrate while reference numeral 21a refers to the optical wave guide. The light propagates in a direction perpendicular to the sheet of the drawing of FIG. 12, with the vibration direction of the electric field being as illustrated for the P polarized light and S-polarized light. As one of ordinary skill in the art would recognize, the P polarized light and S polarized light vibrate in directions perpendicular to one another. In the case of S-polarized light, $$N_1 = n_1 \cos i \tag{3}$$

$$N_2 = n_2 \sqrt{1 - \frac{n_1^2}{n_2^2} \sin^2 i} \tag{4}$$

$$N_3 = n_3 \sqrt{1 - \frac{n_1^2}{n_3^2} \sin^2 i} \tag{5}$$

In the case of P-polarized light, $$N_1 = \cos i / n_1 \tag{6}$$

$$N_2 = \frac{1}{n_2} \sqrt{1 - \frac{n_1^2}{n_2^2} \sin^2 i} \tag{7}$$

$$N_3 = \frac{1}{n_3} \sqrt{1 - \frac{n_1^2}{n_3^2} \sin^2 i} \tag{8}$$

Figure 4A:
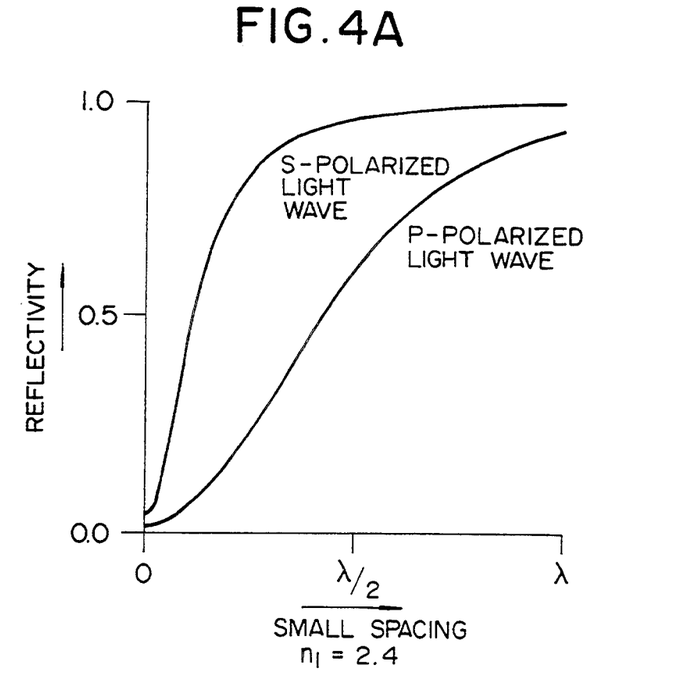
FIGS. 4A, 4B, 5-8 illustrate the principles of a measuring method.
Figure 4B:
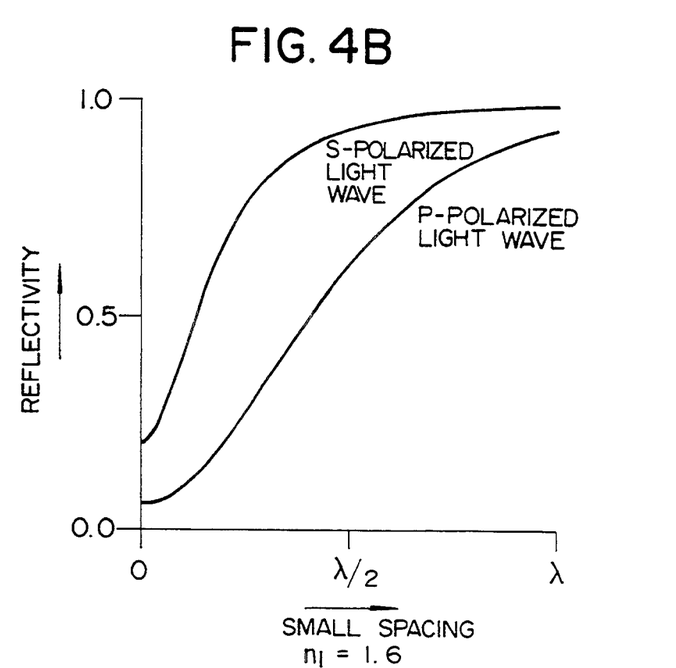

FIG. 4 shows one example of the relationship between small spacing and reflectivity. The axis of abscissas represents normalization of the small spacing with the wavelength λ of the incident light while the axis of ordinates the reflectivity. FIG. 4A represents such relationship where i=18 degrees, $n_1=2.4$, $n_2=3.4$ and $n_3=1.0$ while FIG. 4B shows a similar relationship under the same conditions except that only $n_1=1.6$. The reflectivities of S- and P-polarized light waves are minimum when the small spacing is zero. As the small spacing increases, the reflectivities increase. For S-polarized light, the reflectivity is substantially 1 when the small spacing is λ/2 while for P-polarized light, the reflectivity does not become 1 even if the small spacing is λ. By comparing FIGS. 4A and 4B, it will be seen that the P-polarized light is less influenced by changes in $n_1$.

Figure 5:
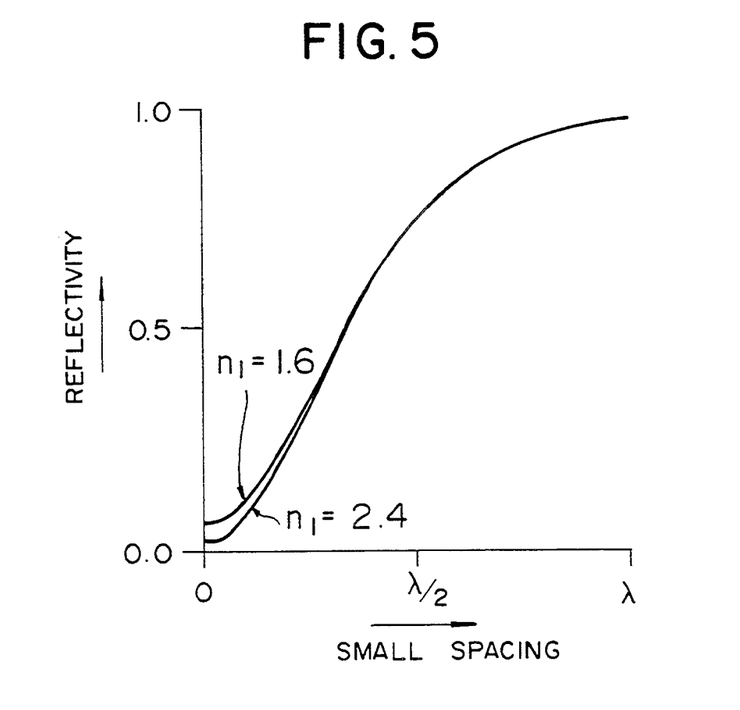

FIG. 5 shows only P-polarized light waves of FIGS. 4A and 4B. When the small spacing is λ/2 or more, the P-polarized light is not influenced by changes in $n_1$, but influenced when the small spacing is less than λ/2 and an error is involved when the small spacing is small.

Figure 6:
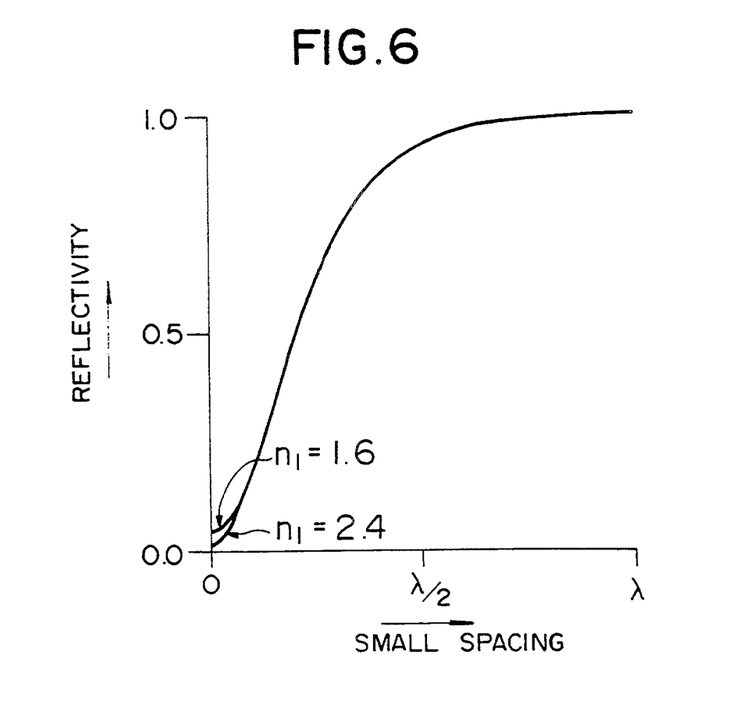
Figure 7:
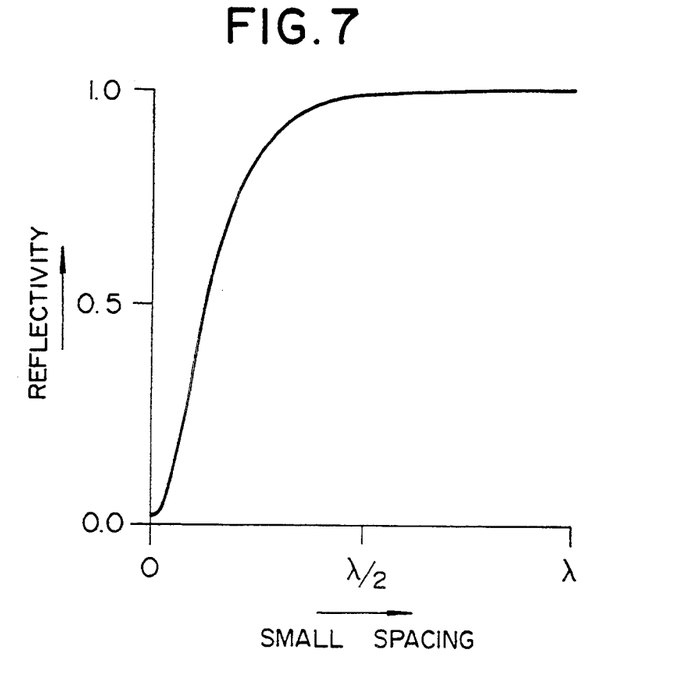

A method of reducing the influence of changes in $n_1$ will be described below. FIG. 6 shows the relationship between small spacing and reflectivity when i=20 degrees and FIG. 7 a similar relationship when i=22 degrees, with the remaining parameters being the same as those in FIG. 5. As i increases, the influence of changes in $n_1$ is reduced, while the small spacing where the reflectivity changes is reduced. Thus, if portions of the relationships of FIGS. 5, 6 and 7 which are not influenced by changes in $n_1$ and where reflectivities are changed by changing the small space are extracted and combined, measurement which is not influenced by changes in $n_1$ and where the range of measuring the small spacing is wide is achieved.

Figure 8:
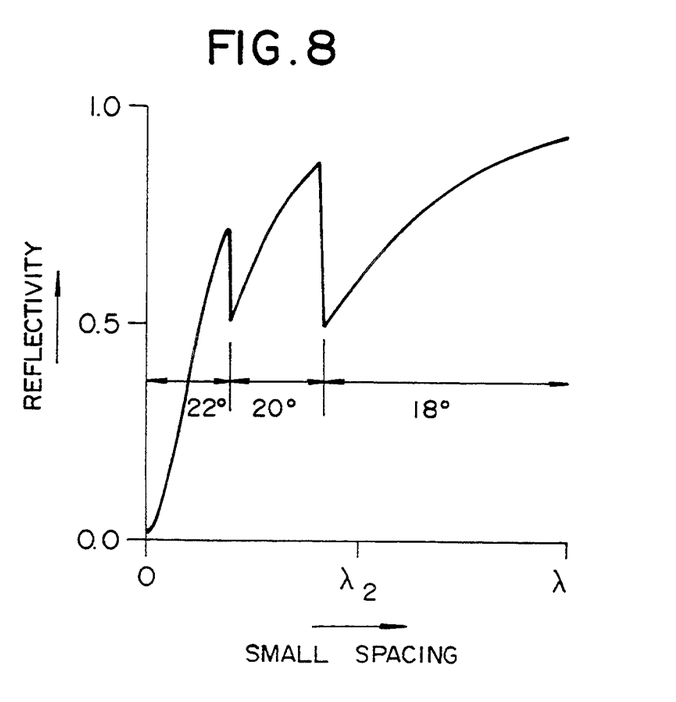

FIG. 8 shows one such example where if the small spacing is narrow, the relationship for i=22 degrees is used; if the spacing is intermediate, the relation for i=20 degrees is used; and the relationship for i=18 degrees is used as the spacing is increased. Conversion computing circuit 27 computes such relationship and outputs a measured small-spacing signal 12.

Figure 9:
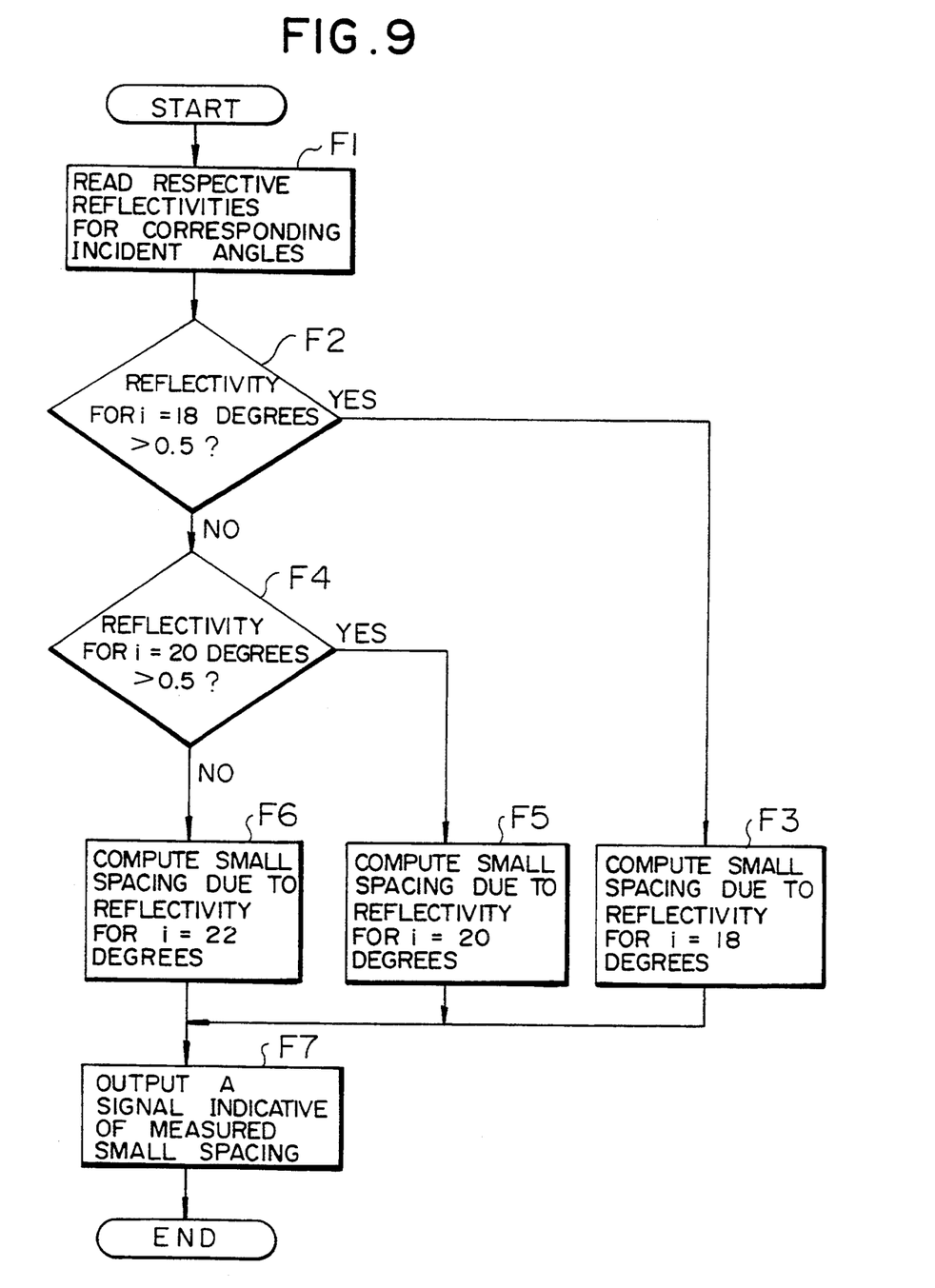
FIG. 9 is a flowchart indicative of the operation of a conversion and operation circuit.

FIG. 9 shows the flow of calculations in the conversion computing unit. First, reflectivities for the respective incident angles are read at F1. If the reflectivity for i=18 degrees is 0.5 or more at F2, the small spacing is calculated using the reflectivity for i=18 degrees at F3. If the reflectivity for i=18 degrees is 0.5 or less at F2, the reflectivity for i=20 degrees is checked at F4. If the reflectivity is 0.5 or more, the small spacing is calculated using the reflectivity for i=20 degrees at F5. Unless the above conditions hold, the small spacing is calculated using the reflectivity for i=22 degrees at F6 and the small spacing calculated at one of F3, F5 and F6 is output as a measured small spacing signal 12 at F7. The calculating method different from the above method is conceivable. For example, refractive indexes $n_2$, $n_3$ are determined by optical converter 2 and the environment where optical converter 2 is used. The respective reflectivites for practically required ranges are calculated using incident angle i, reflectivity $n_1$, and small spacing d as parameters. The respective relationships between reflectivities for the respective incident angles and small spacings are calculated by multivariate recurrence equations to thereby determine a computing process by conversion computing unit 27. This process is applicable even if $n_1$ is a complex number.

Alternatively, it may be arranged that the respective reflectivities for P- and S-polarized light waves are separately detected without using a plurality of incident angles, that the computing process by conversion computing circuit 27 is determined from the relationship between those reflectivites, and that the small spacing is measured.

Figure 10:
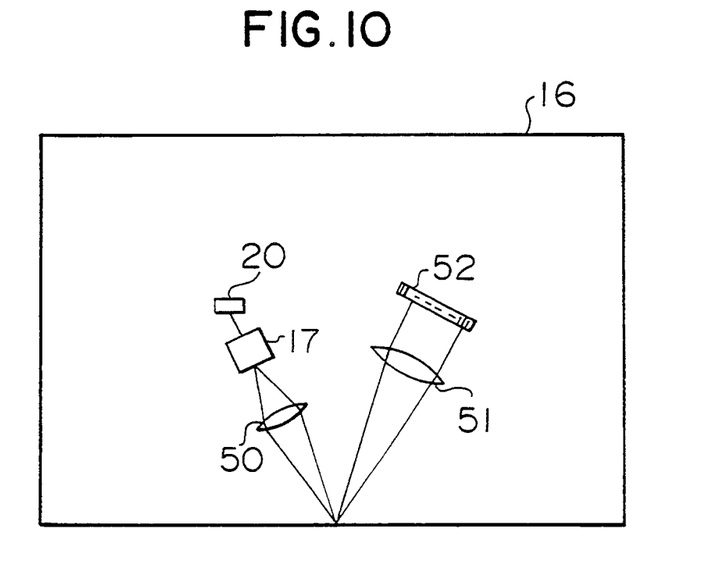
FIG. 10 is a diagram showing the construction of another embodiment of an optical converter.

Another embodiment of optical converter 2 is shown in FIG. 10. The embodiment includes, on substrate 16, light emitting element 17, photodetection element 20, focusing lens 50 which focuses light from light emitting element 17 onto the total reflection surface, collimator lens 51 which guides the reflected light to photodetection element array 52, and photodetection element array 52 which detects the reflectivities for a plurality of reflective angles. This embodiment achieves accurate detection as compared to the FIG. 3 embodiment.

Figure 11:
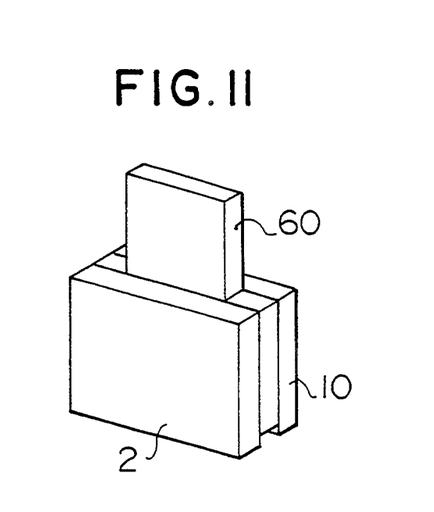
FIG. 11 is a diagram showing the construction of another embodiment of the structure of controlling a small spacing for a magnetic head.

While in the above embodiments description has been made using support 1 used so far, support 1 may be removed if the small spacing is controlled. FIG. 11 shows one embodiment which realizes such concept. Optical converter 2 is fixed to one surface of support plate 60 while magnetic head 10 is fixed to the other surface of support plate 60 with the respective lower ends of members 2 and 10 being flush. Instead of support 1 of FIG. 1, such assembly is attached to the magnetic head height position adjusting actuator 5 to thereby provide a small-spacing having a predetermined height using an operation similar to that described with reference to FIG. 1. Recently, since a magnetic head such as 10 can be manufactured in a semiconductor process, it may be formed on the same substrate as optical converter 2.

According to the present invention, the small spacing can be measured irrespective of whether the recording medium surface is electrically conductive or not, so that small-spacing control can be provided for any recording medium.

According to the present invention, a reflectivity pattern using a plurality of incident angles is used to measure the small spacing, so that the small spacing can be measured even if the refractive index of the recording medium surface changes.

The small spacing measuring elements are optically integrated, so that they may be attached to the magnetic head for use.

We claim:

1. A small spacing control apparatus for controlling a small spacing between a magnetic head and a magnetic recording medium in a magnetic recording apparatus having a support to support the magnetic head in a manner which permits said magnetic head to randomly access a recording surface of the magnetic recording medium, said small spacing control apparatus comprising:

a measuring element disposed at said support; and computing means for calculating the small spacing from a functional relation relating to a quantity of a reflected light received from said measuring element;

wherein said measuring element includes a substrate disposed on a side of said support, a reflection plane formed on the substrate and facing said magnetic recording medium, a light emitting portion disposed at said substrate, an incident-side optical waveguide formed in said substrate for making the light from said light emitting portion incident to said reflection surface with an angle greater than a critical angle so as to generate an oozing light as an evanescent wave from said reflection plane, a reflection-side optical waveguide formed in said substrate for guiding said oozing light and a reflected light from said reflection plane to a reflection side, said reflected light having been attenuated due to contact with said magnetic recording medium, a photodetecting portion formed in said substrate for receiving the reflected light guided by said reflection-side optical waveguide and for feeding the reflected light to said computing means.

2. A small spacing control apparatus according to claim 1, further comprising means for controlling a movement of said measuring element and support with respect to said magnetic recording medium so that the value of a small spacing measurement obtained by said measuring element coincides with a given target value.

3. A small spacing control apparatus according to claim 2, wherein said reflection plane of said measuring element is coplanar with a surface of said support which faces said magnetic recording medium.

4. A small spacing control apparatus according to claim 2, wherein a plane of polarization of said reflected light is made at least one of parallel or perpendicular with respect to a plane defined by the incident light and reflected light.

5. A small spacing control apparatus according to claim 2, wherein the incident light is a light whose plane of polarization has polarization components which are parallel and perpendicular, respectively, with respect to a plane defined by the incident and reflected lights, and wherein the reflected light is separated into lights whose planes of polarization are parallel and perpendicular, respectively, with respect to said plane.

6. A small spacing control apparatus according to claim 5, wherein said computing means receives the separated reflected lights which correspond to the dimension of the small spacing, to calculate the small spacing.

7. A small spacing control apparatus according to claim 2, wherein said incident-side optical waveguide divides the light from the light emitting source into two or more lights and guides the divided lights to the reflection plane so that the divided lights are incident to said reflection plane with angles which are different from one another and at the same time allow the di7 vided, incident lights to be totally reflected, said reflection-side optical waveguide guides reflected lights each being reflected with their own reflection angles, to said photodetecting portion.

8. A small spacing control apparatus according to claim 7, wherein said computing means receives reflected lights generated from said divided lights to calculate the small spacing, said reflected lights corresponding to the dimension of said small spacing.

9. A small spacing control apparatus according to claim 7, wherein said computing means calculates a relationship between an index of refraction and the small spacing, based on multivariate recurrence equations, using as parameters, an incident angle of the incident light, an index of refraction of the surface of the magnetic recording medium and the small spacing.

10. A small spacing control apparatus for controlling a small spacing between a magnetic head and a magnetic recording medium in a magnetic recording apparatus in which said magnetic head is supported by a support in a manner which allows said magnetic head to randomly access a recording surface of the magnetic recording medium, said small spacing control apparatus comprising:

a measuring element disposed at said support; and computing means for computing the small spacing from a functional relation relating to a quantity of reflected light from said measuring element, wherein said measuring element includes a substrate disposed on a side of said support, a reflection plane formed on the substrate and facing said magnetic recording medium, a light emitting portion disposed in said substrate, lens means for condensing a light from said light emitting portion propagating in said substrate onto said reflection plane so that said condensed light is incident to said reflection plane with an angle greater than a critical angle so that an oozing light generates from said reflection plane as an evanescent wave;

a plurality of photodetecting portions disposed at said substrate and which receive said oozing light from said reflection plane and the reflected light from said reflection plane, said reflected light being attenuated due to contact with said magnetic recording medium, the plurality of photodetecting portions outputting the received oozing light and reflected light to said computing means.

11. A small spacing control apparatus according to claim 10, further comprising a collimator lens disposed between the reflection plane and the plurality of photodetecting portions.

12. A small spacing control apparatus according to claim 10, further comprising means for controlling a movement of said measuring element and support relative to said magnetic recording medium so that the value of the small spacing obtained by said measuring element agrees with a given target value.

13. A method of controlling a small spacing for a magnetic head with respect to a magnetic recording medium to compensate for an error between a given target value and a measured value obtained by measuring the small spacing between the magnetic head and the magnetic recording medium, comprising the steps of:

causing a reflection plane of a measuring element to face said magnetic recording medium, said measuring element having said reflection plane which emits an oozing light as an evanescent wave towards said small spacing when facing said magnetic recording medium, a light emitting portion which emits an incident light to said reflection plane with a certain angle greater than a critical angle so that said oozing light is emitted from said reflection plane, and a photodetecting portion which receives a reflected light from said reflection plane;

causing said incident light from said light emitting portion of said measuring element to be incident onto said reflection plane via said measuring element;

receiving said oozing light from said reflection plane of said measuring element and said reflected light from said reflection plane which has been attenuated due to contact with said magnetic recording medium; and calculating said small spacing by means of a computing circuit by using a functional relation related to said reflected light, based on the reflected light received in the preceding step.

14. A method according to claim 13, further comprising a step of controlling the movement of said measuring element with respect to said magnetic recording medium so that the measured value of the small spacing obtained from said reflected light agrees with the given target value, said measuring element being disposed at a support which supports the magnetic head.

15. A method according to claim 14, wherein said incident light from said light emitting portion contains polarized light components, with planes of polarization of which are parallel and perpendicular, respectively, with respect to a plane defined by the incident light, wherein said reflected light is separated into a reflected light component whose plane of polarization is parallel with said plane defined by the incident light and another reflected light component whose plane of polarization is perpendicular to said plane defined by the incident light, and signals representing intensities of the respective reflected light components received are used by said computing circuit to calculate said small spacing.

16. A method according to claim 14, wherein said light emitting portion emits a plurality of incident light to said reflection plane with different angles greater than said critical angle, wherein said light receiving portion receives each of a plurality of reflected lights reflected from said reflection plane, and wherein said computing circuit calculates the small spacing by using signals representing intensities of respective reflected lights received.

17. A method according to claim 16, wherein said computing circuit calculates the dimensions of said small spacing from said plurality of reflected lights generated from said incident lights being incident with different angles, which correspond to a dimension of said small spacing.

18. A method according to claim 16, wherein said computing circuit calculates a relation between an index of refraction and the small spacing, based on multivariate analysis equations, using as parameters the incident angle of the incident light, an index of refraction on the surface of the magnetic recording medium and the small spacing.

* * * * *